(12) United States Patent
Cameron et al.

(10) Patent No.: US 8,905,774 B2
(45) Date of Patent: Dec. 9, 2014

(54) THREAD LOCKING FEATURE FOR USE WITH CONNECTORS

(71) Applicant: Inova, Ltd., Grand Cayman (KY)

(72) Inventors: Randall V. Cameron, Airdrie (CA); Terry E. Wood, Calgary (CA)

(73) Assignee: Inova Ltd., Grand Cayman (KY)

( * ) Notice: Subject to any disclaimer, the term of this patent is extended or adjusted under 35 U.S.C. 154(b) by 107 days.

(21) Appl. No.: 13/750,475

(22) Filed: Jan. 25, 2013

(65) Prior Publication Data

US 2013/0189869 A1 Jul. 25, 2013

Related U.S. Application Data

(60) Provisional application No. 61/590,641, filed on Jan. 25, 2012.

(51) Int. Cl.
| | |
|---|---|
| H01R 13/62 | (2006.01) |
| H01R 13/627 | (2006.01) |
| H01R 43/16 | (2006.01) |
| H01R 13/512 | (2006.01) |
| H01R 13/623 | (2006.01) |
| G01V 1/20 | (2006.01) |

(52) U.S. Cl.
CPC .......... *H01R 13/512* (2013.01); *H01R 13/6276* (2013.01); *H01R 43/16* (2013.01); *H01R 13/623* (2013.01); *G01V 1/202* (2013.01)
USPC .......................................... 439/306; 439/321

(58) Field of Classification Search
CPC .... H01R 33/971; H01R 33/94; H01R 13/622; H01R 13/623; H01R 13/512
USPC .......................... 439/306, 320, 321, 322, 277
See application file for complete search history.

(56) References Cited

U.S. PATENT DOCUMENTS

| | | | |
|---|---|---|---|
| 3,901,574 A * | 8/1975 | Paullus et al. | ................. 439/315 |
| 4,688,877 A | 8/1987 | Dreyer | |
| 5,507,530 A | 4/1996 | Mahaney | |
| 5,683,115 A | 11/1997 | Hill | |
| 5,692,918 A | 12/1997 | Hill | |
| 5,979,838 A | 11/1999 | Romagnoli, Jr. | |
| 6,073,973 A | 6/2000 | Boscaljon et al. | |
| 6,796,853 B1 | 9/2004 | Tomasino | |
| 6,908,121 B2 | 6/2005 | Hirth et al. | |
| 6,997,731 B1 * | 2/2006 | Wood et al. | ................... 439/314 |

(Continued)

FOREIGN PATENT DOCUMENTS

| | | |
|---|---|---|
| WO | 2008039452 A2 | 4/2008 |
| WO | 2010027946 A2 | 3/2010 |
| WO | WO 2013/112872 A1 * | 1/2013 |

OTHER PUBLICATIONS

PCT/US2013/023195—International Search Report dated Apr. 2, 2013.

*Primary Examiner* — Hae Moon Hyeon
(74) *Attorney, Agent, or Firm* — Mossman, Kumar & Tyler PC

(57) ABSTRACT

A connector for forming an electrical connection includes a connector body having internal threads formed on an inner surface, a locking member mounted in the connector body and resiliently projecting into a valley of the internal threads, and a plug having external threads complementary to the internal threads. The apex of the external threads may include a recess for receiving the locking member.

18 Claims, 4 Drawing Sheets

(56) References Cited

U.S. PATENT DOCUMENTS

| | | |
|---|---|---|
| 7,333,391 B2 | 2/2008 | Chamberlain et al. |
| 7,566,236 B2 | 7/2009 | Malloy et al. |
| 7,660,206 B2 | 2/2010 | Berg et al. |
| 7,778,114 B2 | 8/2010 | Goujon et al. |
| 2003/0091383 A1 | 5/2003 | Conway |
| 2012/0061355 A1 | 3/2012 | Simek et al. |
| 2013/0127155 A1 | 5/2013 | Nick et al. |

* cited by examiner

THREAD LOCKING FEATURE FOR USE WITH CONNECTORS

CROSS-SECTION TO RELATED APPLICATIONS

This application claims priority from U.S. Provisional Application Ser. No. 61/590,641, filed Jan. 25, 2012, the disclosure of which is fully incorporated herein by reference in its entirety.

FIELD OF THE DISCLOSURE

This disclosure generally relates to locking arrangements and methods for connectors used to make electrical connections.

BACKGROUND OF THE DISCLOSURE

Seismic surveys are conducted to map subsurface structures to identify and develop oil and gas reservoirs. Seismic surveys are typically performed to estimate the location and quantities of oil and gas fields prior to developing (drilling wells) the fields and also to determine the changes in the reservoir over time subsequent to the drilling of wells. On land, seismic surveys are conducted by deploying an array of seismic sensors (also referred to as seismic receivers) over selected geographical regions. These arrays typically cover 75-125 square kilometers or more of a geographic area and include 2000 to 5000 seismic sensors. The seismic sensors (geophones or accelerometers) are coupled to the ground in the form of a grid. An energy source, such as an explosive charge (buried dynamite for example) or a mobile vibratory source, is used at selected spaced apart locations in the geographical area to generate or induce acoustic waves or signals (also referred to as acoustic energy) into the subsurface. The acoustic waves generated into the subsurface reflect back to the surface from discontinuities in a subsurface formation, such as those formed by oil and gas reservoirs. The reflections are sensed or detected at the surface by the seismic sensors (hydrophones, geophones, etc.). Data acquisition units deployed in the field proximate the seismic sensors may be configured to receive signals from their associated seismic sensors, at least partially processes the received signals, and transmits the processed signals to a remote unit (typically a central control or computer unit placed on a mobile unit). The central unit typically controls at least some of the operations of the data acquisition units and may process the seismic data received from all of the data acquisition units and/or record the processed data on data storage devices for further processing. The sensing, processing, and recording of the seismic waves is referred to as seismic data acquisition.

Such systems may use numerous electrical connections that must be formed in an open environment. This disclosure addresses the need for robust connectors that can be used to make connections with a high degree of reliability.

SUMMARY OF THE DISCLOSURE

In aspects, the present disclosure is related to methods and apparatuses for selectively locking electrical connections. In one aspect, the present disclosure provides a connector for forming an electrical connection. The connector may include a connector body having internal threads formed on an inner surface, a locking member mounted in the connector body and resiliently projecting into a valley of the internal threads, and a plug having external threads complementary to the internal threads. The apex of the external threads may include a recess for receiving the locking member.

In another aspect, the connector may include a connector body having internal threads formed on an inner surface and a plurality of slots circumferentially arrayed along an inner diameter of the internal threads, a locking member disposed in each of the plurality of slots, a resilient ring retaining each locking member in an associated slot, and a plug having external threads complementary to the internal threads. The outer diameter of the external threads may include a recess for receiving each locking member, and each locking member may have a retracted position when engaging the outer diameter and a locked position when seated in an associated recess.

Examples of certain features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

The present disclosure relates to devices and methods for selectively locking electrical connections between electrical components used during seismic data acquisition. The present disclosure may be implemented in embodiments of different forms. The drawings shown and the descriptions provided herein correspond to certain specific embodiments of the present disclosure for the purposes of explanation of the concepts contained in the disclosure with the understanding that the present disclosure is to be considered an exemplification of the principles of the disclosure.

Figure 1:
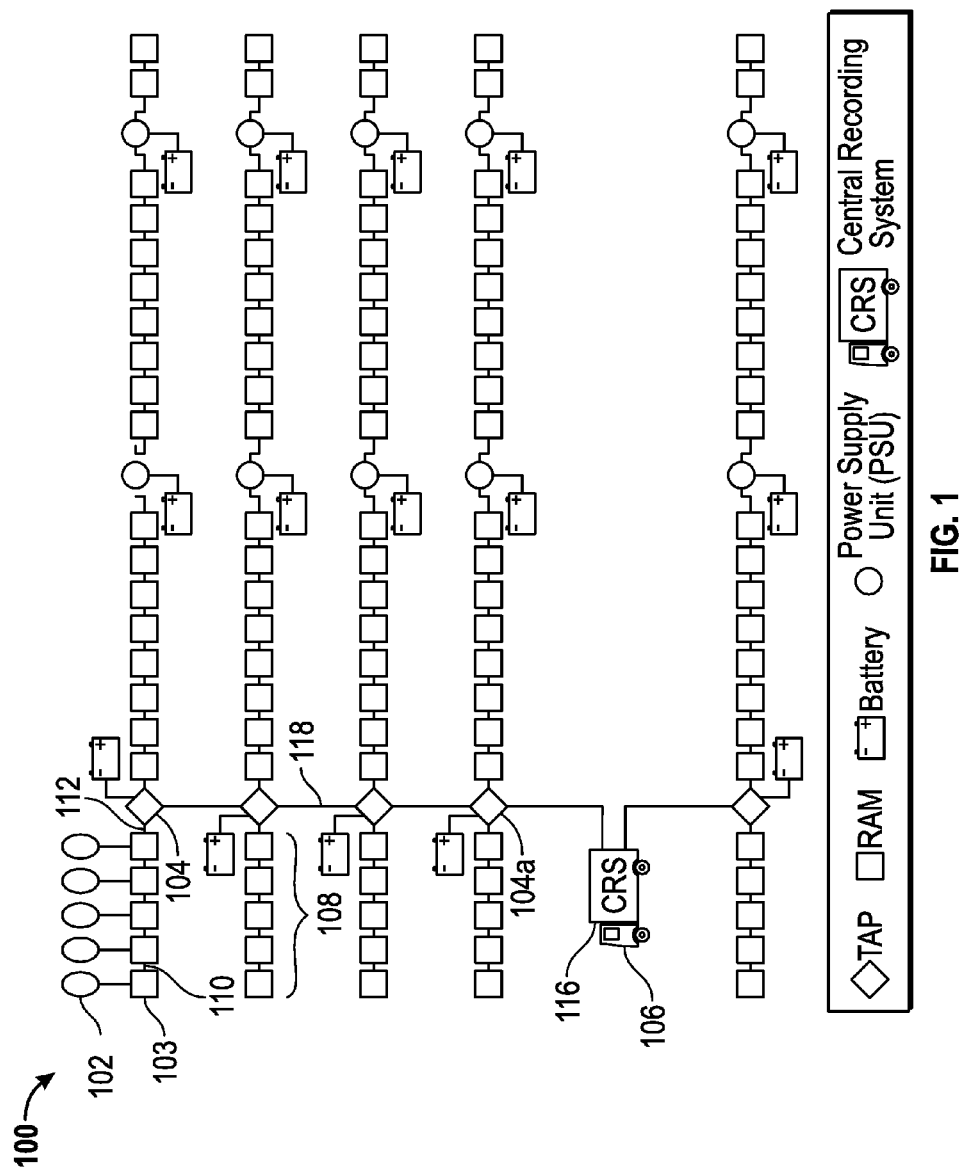
FIG. 1 shows a schematic of a seismic survey system according to one embodiment of the present disclosure.

FIG. 1 depicts an embodiment of a cable seismic data acquisition system 100. Such a system includes an array (string) of spaced-apart seismic sensor units 102. Seismic sensors units 102 may include, but are not limited to, multi-component sensors such as a three-component accelerometer sensor incorporating micro electro-mechanical systems (MEMS) technology, velocity sensors such as a conventional geophone or a pressure sensor such as a conventional hydrophone. Any sensor unit capable of sensing seismic energy may be used. Each sensor unit 102 is typically coupled via cabling to a data acquisition device (such as remote acquisition module (RAM) 103), and several of the data acquisition devices and associated sensor units 102 are coupled via cabling 110 to form a line or group 108. The group 108 is then coupled via cabling 112 to a line tap (such as fiber TAP unit (FTU) 104). Several FTUs 104 and associated lines 112 are usually coupled together by cabling, such as shown by the baseline cable 118.

A RAM 103 may be configured to record analog seismic signals that are generated by the sensors units 102. The RAM 103 may be configured to convert analog signals from the sensor units 102 into digital signals. The digitized information may then be transmitted to an FTU 104. One or more FTU's 104, such as FTU 104a, may be configured to transmit the digitized information to a central recording system (CRS) 106. The devices involved in seismic data acquisition may be collectively referred to as "seismic devices," which may include, but is not limited to: sensor units 102, RAMs 103, and FTUs 104, CRS 106, and other associated auxiliary devices 116.

In wireless embodiments, the FTUs 104 may communicate with the CRS 106 using radio frequency transmissions and are typically bandwidth limited. In traditional wireless seismic data acquisition systems, an attribute (physical or seismic) degradation affecting the data quality is typically detected by monitoring (printing and viewing) shot (source activation) records immediately after recording.

As should be appreciated, seismic data acquisition systems, whether cabled-based such as the system 100 or a wireless system, require numerous electrical connections. Moreover, these connections may have to be formed in the field, which subjects the connections to harmful environmental conditions (e.g., dirt, moisture, shock from rough handling, etc.).

Figure 2A:
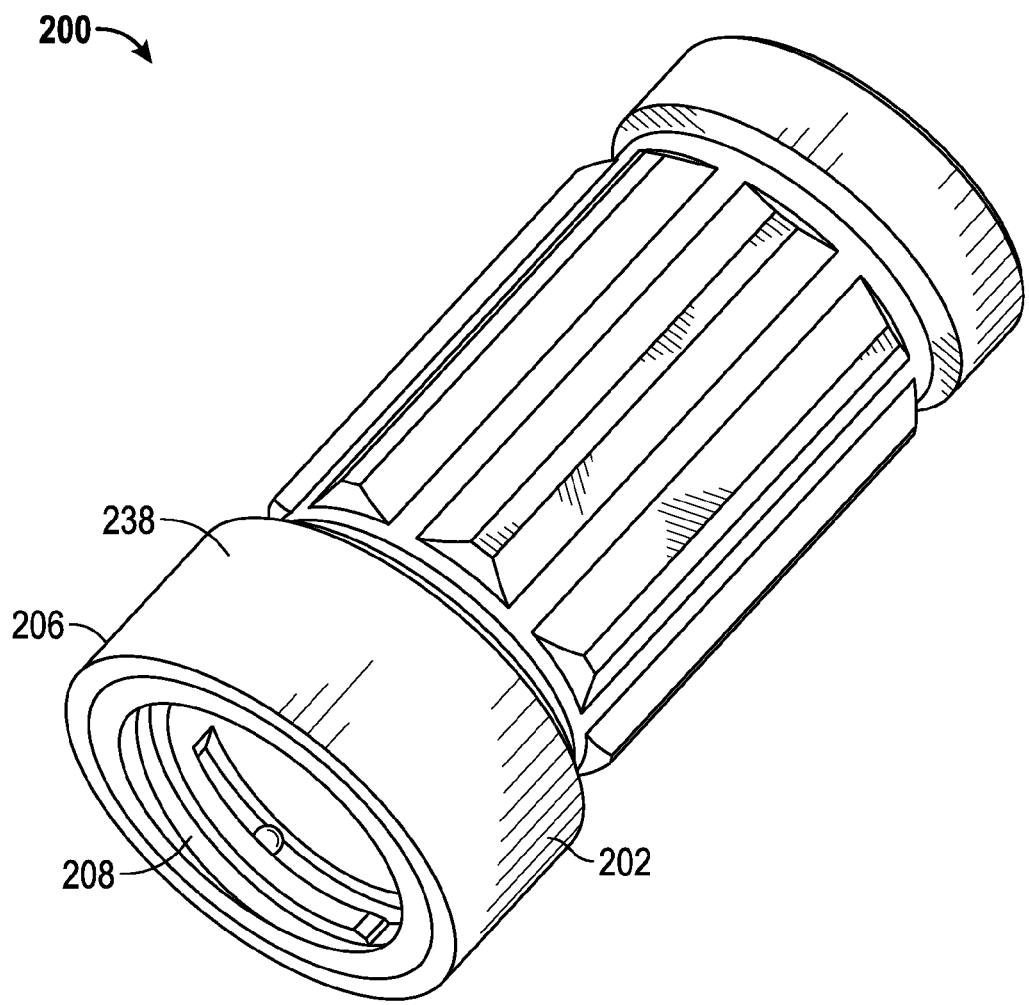
FIG. 2A shows an isometric view of a connector body of a connector according to one embodiment of the present disclosure.

Referring now to FIGS. 2A and B, there is shown one embodiment of a connector 200 that incorporates a locking arrangement for ensuring a robust and reliable connection between two electrical components, e.g., a cable and a data processing unit, of a seismic data acquisition system. The connector 200 is an assembly that includes a connector body 202 (FIG. 2A) and a plug 204 (FIG. 2B).

Referring now to FIG. 2A, the connector body 202 may be a generally tubular member having a receiving end 206 in which internal threads 208 are formed. The internal threads 208 may utilize any thread form (e.g., acme threads, square threads, trapezoidal threads, triangular threads, etc.) for interconnecting the connector body 202 with the plug 204 (FIG. 2B), which has external threads 209 (FIG. 2B) complementary to the internal threads 208. As best illustrated in the section view of FIG. 3, the internal threads 208 may be generally defined by a valley 210 (or outer diameter) and an apex 212 (or inner diameter).

Figure 2B:
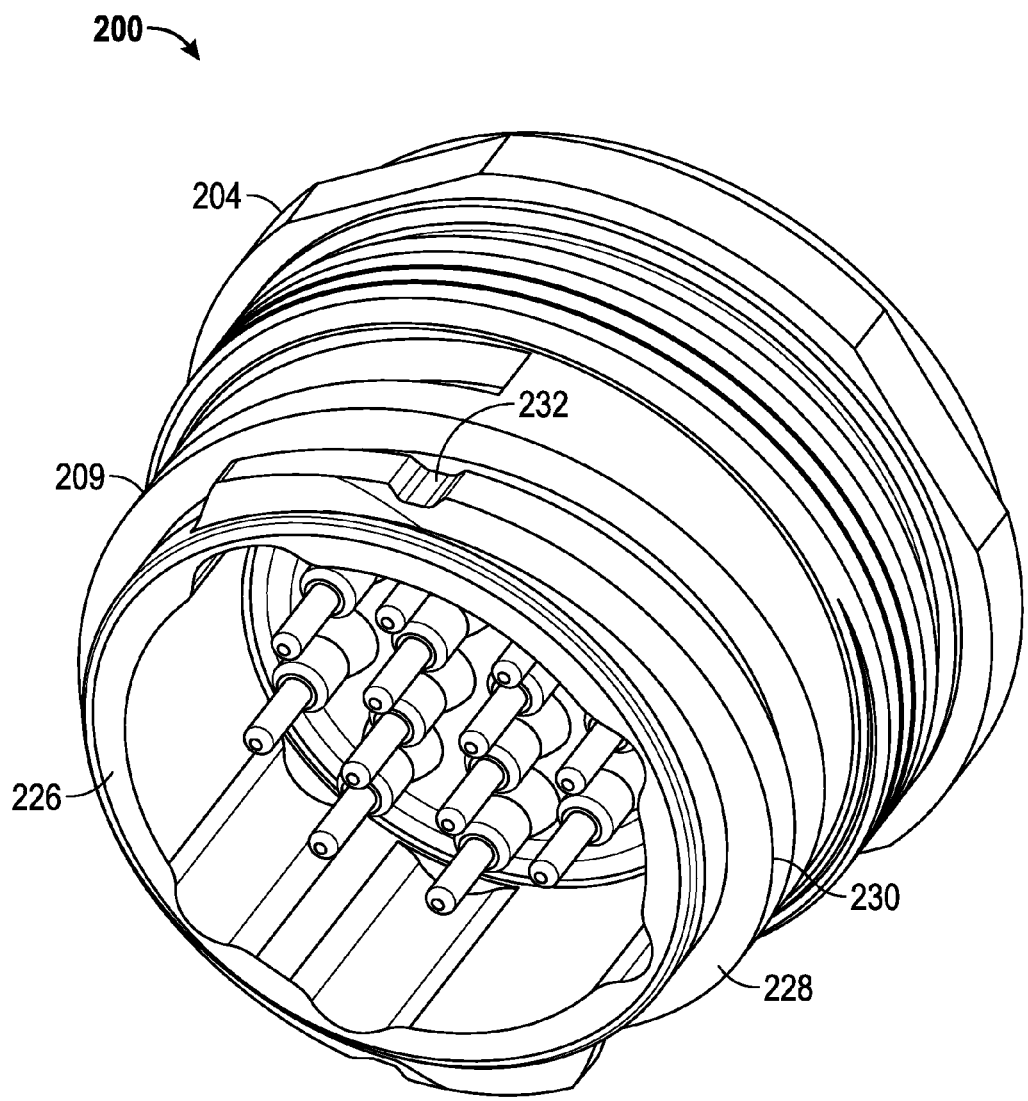
FIG. 2B shows an isometric view of a plug of a connector according to one embodiment of the present disclosure.
Figure 3:
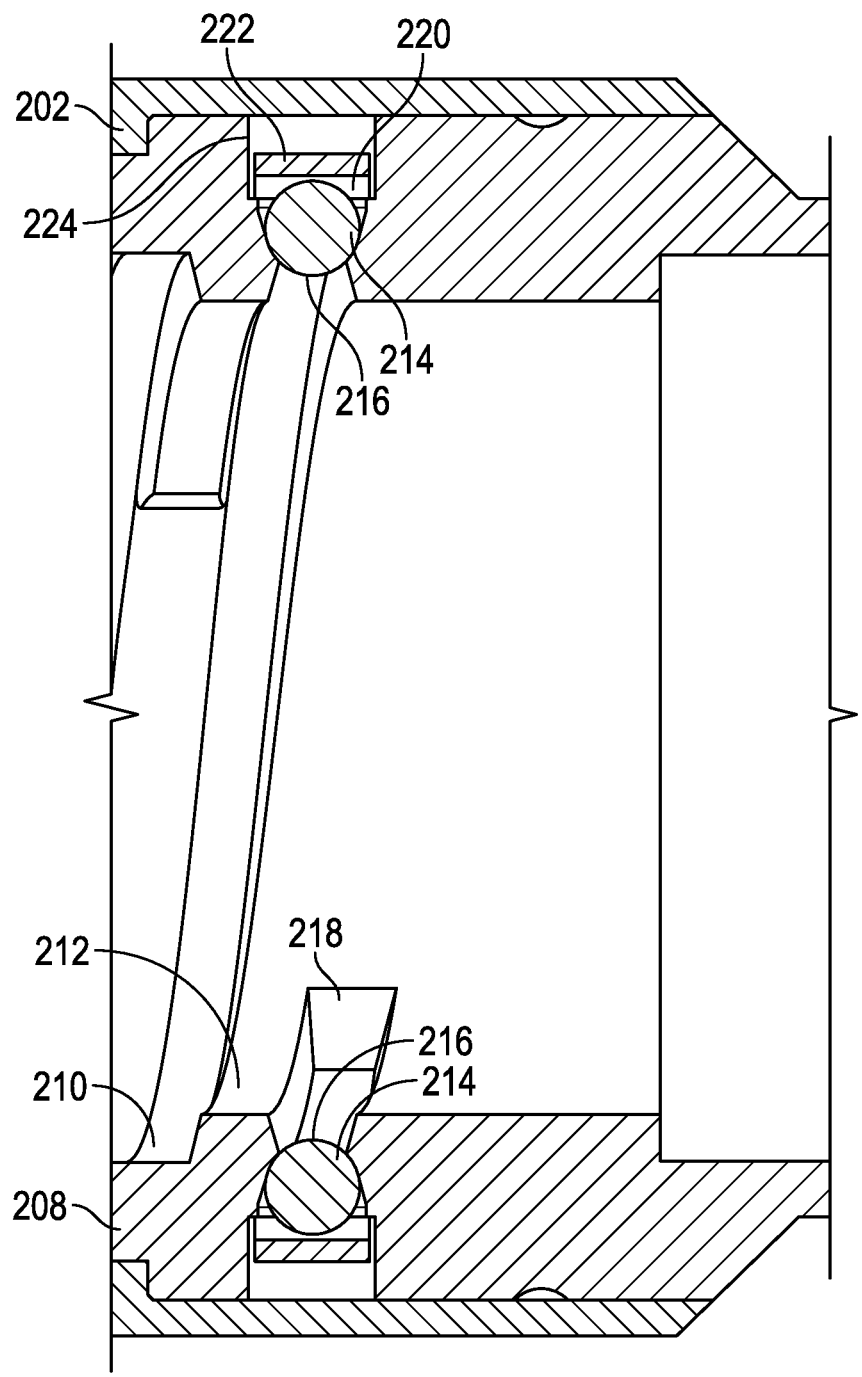
FIG. 3 shows a sectional view of the FIG. 2A embodiment.

Referring still to FIG. 3, one or more locking members 214 may be used to selectively lock the connector body 202 to the plug 204 (FIG. 2B). As used herein, the connector body 202 and the plug 204 (FIG. 2B) are considered in an unlocked condition when the torque required to cause relative rotation between the connector body 202 and the plug 204 does not exceed a predetermined torque value. By predetermined, it is meant that the torque value is an empirically known or measured value that may be used while assembling or disassembling the connector 200. The connector body 202 and the plug 204 (FIG. 2B) are considered in a locked condition when the torque required to cause such relative rotation must exceed the predetermined torque value. In one arrangement, the locking members 214 may be rigid spherical bodies. For example, the locking members 214 may be stainless balls.

In one non-limiting embodiment, the connector body 202 includes one or more slots 216 in which the locking members 214 slide radially between a locked position and an unlocked position. The slots 216 penetrate into the valley 210 of the internal threads 208. Each slot 216 is shaped to seat a locking member 214 such that a portion of the locking member 214 protrudes into the valley 210. The slots 216 may be shaped such that the locking members 214 seat with minimal interstitial space at the contacting surfaces. For example, the slots 216 may have a "v" shape or a curved surface that substantially matches the curvature of the outer surface of the spherical locking members 214.

The locking members 214 are actuated into the locked position by biasing members 220, 222. A biasing member is a structure that can push or pull an object in a specified direction. Generally, a biasing member is an elastically deformable member that can apply a spring force to urge the object in a desired direction. For example, the biasing members 220, 22 may have a centripetal tension that urges the locking member 214 radially inwardly to position the portion of the locking member 214 in the valley 210. The biasing members 220, 222 have a modulus selected such that a specified amount of centripetal force is applied to the locking member 214. This centripetal force urges the locking member 214 to have maximum protrusion into the valley 210. This co-action is resilient in that contact with the external threads 209 (FIG. 2B) of the plug 204 creates an opposing contact force at the mating surfaces. The biasing members 220, 222 flex to allow the locking member 214 to move radially outward as the opposing force grows in magnitude.

In one embodiment, the biasing members 220, 222 may be rings that seats within a circumferential groove 224 formed in the connector body 202. In some arrangements, the biasing members 220, 222 may be split-rings formed of a metal. In other arrangements, the biasing members 220, 222 may be formed of a non-metal. Also, while two biasing members 220, 222 are shown, it should be understood that greater or fewer number of biasing members 220, 222 may be used.

Referring now to FIGS. 2B and 3, the plug 204 may be a generally tubular member having a lead end 226 shaped to enter the receiving end 206. The outer threads 209 are formed on the lead end 226 and may be generally defined by a valley 228 (or inner diameter) and an apex 230 (or outer diameter). In one embodiment, a recess 232 is formed on the apex 230 proximate to the lead end 226. The recess 232 is shaped to seat the portion of the locking member 214 that protrudes into the valley 210 of the internal threads 208. The plug 204 may include a recess 224 for each of the two shown locking members 214. By "proximate," is meant "close to" or "near" such that the recess 232 can be technically considered at the same location as the lead end 226.

In an exemplary mode of use, the lead end 226 of the plug 204 is inserted into the connector receiving end 206 (FIG. 2A). As the connector body 202 and the plug 204 are rotated relative to one another, the internal threads 208 and the external threads 209 engage. Specifically, the apex 230 of the external threads 209 slide along the valley 210 of the internal threads 208. For a majority of the engagement, this sliding is not impeded. In the arrangement shown, the locking members 214 are positioned proximate to a terminal end 218 of the internal threads 208. By "proximate," is meant "close to" or "near" such that the locking members 214 can be technically considered at the same location as the terminal end 218.

Thus, toward the completion of the connection, the apex 230 sequentially contacts the locking members 214. At this point, one need to increase the torque required to continue rotation because the centripetal force applied by the biasing members 220, 222 must be overcome to shift the locking members 214 radially outward. Advantageously, this increased torque furnishes an indication that the connection is near completion.

Once shifted radially outward, the apex 230 continues to travel along the valley 210 until the recesses 232 rotationally align with the locking members 214. When rotationally aligned, the locking members 214 shift radially inward and form a mating relationship between the connector body 202 and the plug 204. This radial shift may be accompanied by an audible "snap" and an abrupt change (e.g., increase) in the torque needed for relative rotation between the connector body 202 and the plug 204. Advantageously, this radial shift indicates that the connection is complete.

After the connection has been formed, the tension in the biasing members 220, 222 resiliently seats the locking members 214 in their respective recesses 232. Thus, rotation in either direction will require a relatively higher torque than the torque needed while making the connection. The locking arrangement may be considered "selective" in that the locking relationship may be undone by applying a preset amount of torque to the connector body 202 and/or the plug 204.

It should be understood that the connector 200 according to the present disclosure may be susceptible to various embodiments. For instance, while the FIG. 2A embodiment uses two locking members 214, a greater or a fewer number of locking members 214 may be used. Also, in some embodiments, a collar 238 may be used to at least partially enclose the connector body 202. The collar 238 may provide a protective casing for the biasing members 220, 222 and locking members 214. In other embodiments, the collar 238 may be omitted.

In other variants, the locking members 214 may be formed as cylindrical pins that translate in bores formed in the connector body 202. In still other embodiments, the biasing members 220, 222 may utilize other configurations, e.g., coiled springs, leaf springs, stacked spring washers, etc. In yet other embodiments, the locking members 214 may be disposed in the plug 204 and the associated recesses 232 may be formed in the connector body 202. In still other embodiments, the locking members 214 may be positioned toward the lead end of the internal threads 208 and associated slots 216 may be positioned toward the terminal end of the external threads 209.

While the foregoing disclosure is directed to the one mode embodiments of the disclosure, various modifications will be apparent to those skilled in the art. It is intended that all variations be embraced by the foregoing disclosure.

What is claimed is:

1. A connector for forming an electrical connection, comprising:
   a connector body having internal threads formed on an inner surface;
   a locking member mounted in the connector body, the locking member resiliently projecting into a valley of the internal threads; and
   a plug having external threads complementary to the internal threads, and wherein an apex of the external threads includes a recess for receiving the locking member.

2. The connector of claim 1, further comprising:
   a cable configured to convey seismic information, wherein the plug is connected to an end of the cable;
   a seismic device configured to communicate via the cable, wherein the connector body is connected to the seismic device;
   a resilient ring disposed in the connector body, the resilient ring urging the locking member into the valley of the internal threads;
   wherein the locking member is a rigid body that is configured to move radially outward when engaged with the apex of the external threads and move radially inward into a locking relationship with the recess of the apex;
   wherein the resilient ring increases the torque required to cause relative rotation between the connector body and the plug after the locking member is in the locking relationship with the recess of the apex; and
   wherein the internal threads have a terminal end, the locking member being disposed proximate to the terminal end, and wherein the external threads have a leading end, the recess being formed proximate to the leading end.

3. The connector of claim 2, comprising:
   wherein the locking member includes a plurality of locking members disposed on opposing sides of the connector body.

4. The connector of claim 2, comprising:
   wherein the locking member has a spherical body and wherein the recess of the apex has a curved seat to receive the spherical body.

5. The connector of claim 1, wherein the locking member is configured to move radially outward when engaged with the apex of the external threads and move radially inward into a locking relationship with the recess of the apex.

6. The connector of claim 5, further comprising a biasing member disposed in the connector body, the biasing member urging the locking member into the locking relationship with the recess of the apex.

7. The connector of claim 6, wherein a spring force of the biasing member is selected to apply a centripetal tension to maintain a locking relationship with the recess of the apex, to thereby prevent further engaging rotation between the connector body and the plug.

8. The connector of claim 7, comprising:
   wherein the locking member includes a plurality of locking members disposed on opposing sides of the connector body.

9. The connector of claim 7, comprising:
   wherein the locking member has a spherical body and wherein the recess of the apex has a curved seat to receive the spherical body.

10. The connector of claim 1, wherein the locking member includes a plurality of locking members disposed on opposing sides of the connector body.

11. The connector of claim 1, wherein the locking member has a spherical body and wherein the recess of the apex has a curved seat to receive the spherical body.

12. A method for forming an electrical connection, comprising:
    forming a connector body having internal threads formed on an inner surface and a plurality of slots circumferentially arrayed along an inner diameter of the internal threads;
    disposing a locking member in each of the plurality of slots;
    retaining each locking member in an associated slot with a resilient ring;
    forming a plug with external threads complementary to the internal threads, wherein an outer diameter of the external threads includes a recess for receiving each locking member, and wherein each locking member has a retracted position when engaging the outer diameter and a locked position when seated in an associated recess; and
    mating the plug with the connector body until the locking members seat in their associated recesses.

13. A connector for forming an electrical connection, comprising:
    a connector body having internal threads formed on an inner surface and a plurality of slots circumferentially arrayed along an inner diameter of the internal threads;
    a locking member disposed in each of the plurality of slots;
    a resilient ring retaining each locking member in an associated slot; and a plug having external threads complementary to the internal threads, wherein an outer diameter of the external threads includes a recess for receiving each locking member, and wherein each locking member has a retracted position when engaging the outer diameter and a locked position when seated in an associated recess.

14. The connector of claim 13, wherein the internal and external threads have one of: (i) an ACME thread form, (ii) a square thread form, (iii) a trapezoidal thread form, and (iv) a triangular thread form.

15. The connector of claim 13, wherein the internal threads have a terminal end, the locking members being disposed proximate to the terminal end, and wherein the external threads have a leading end, the recesses being formed proximate to the leading end.

16. The connector of claim 15, wherein the plug and the connector have a predefined mating relationship, and wherein the locking members are positioned to engage the associated recesses when the plug and the connector have the predefined mating relationship.

17. The connector of claim 13, further comprising a collar at least partially enclosing the connector body and encasing the locking member and the resilient ring.

18. The connector of claim 13, wherein the resilient ring has a spring force selected to maintain each locking member in an associated recess when subjected to a torque below a specified value.

* * * * *